(12) United States Patent  
Raffy

(10) Patent No.: US 7,623,694 B2  
(45) Date of Patent: Nov. 24, 2009

(54) METHOD AND APPARATUS FOR CLASSIFYING DETECTION INPUTS IN MEDICAL IMAGES

(75) Inventor: Philippe Raffy, Sunnyvale, CA (US)

(73) Assignee: MeVis Medical Solutions, Inc., Pewaukee, WI (US)

( * ) Notice: Subject to any disclaimer, the term of this patent is extended or adjusted under 35 U.S.C. 154(b) by 450 days.

(21) Appl. No.: 11/344,834

(22) Filed: Jan. 31, 2006

(65) Prior Publication Data

US 2007/0177781 A1  Aug. 2, 2007

(51) Int. Cl.
*G06K 9/00* (2006.01)
*G06K 9/62* (2006.01)

(52) U.S. Cl. .................. 382/128; 382/131; 382/224
(58) Field of Classification Search ......... 382/128–133, 382/224, 226, 227
See application file for complete search history.

(56) References Cited

U.S. PATENT DOCUMENTS

| 6,769,066 B1* | 7/2004 | Botros et al. ................ 726/23 |
| 2003/0076992 A1* | 4/2003 | Banish et al. ............... 382/156 |
| 2004/0143402 A1* | 7/2004 | Colinge et al. ............... 702/19 |
| 2004/0172378 A1* | 9/2004 | Shanahan et al. .............. 707/1 |
| 2005/0100208 A1* | 5/2005 | Suzuki et al. ............... 382/157 |
| 2006/0168329 A1* | 7/2006 | Tan et al. .................. 709/238 |

* cited by examiner

*Primary Examiner*—John B Strege
(74) *Attorney, Agent, or Firm*—Quarles & Brady LLP

(57) ABSTRACT

Detection inputs are classified using two thresholds. In a preferred embodiment, a multiplicity of inputs are scored and the scored inputs are searched to locate an input that has a score greater than a first threshold. If such input is found, every input having a score in excess of a second threshold lower than the first threshold is identified as belonging to a first class of interest. If no input is found having a score in excess of the first threshold, no inputs are identified as belonging to the first class.

22 Claims, 5 Drawing Sheets

METHOD AND APPARATUS FOR CLASSIFYING DETECTION INPUTS IN MEDICAL IMAGES

FIELD OF THE INVENTION

The invention disclosed herein relates to a method and apparatus for classifying detection inputs in medical images. A particular application of the invention is in tomographic scanning for pulmonary embolisms.

BACKGROUND OF THE INVENTION

Numerous detection systems identify an input by comparing it with a large set of known examples. Such systems are known as classifiers. A variety of different techniques are available for use in classifiers. Several of these techniques involve using a set of known examples to train the classifier to discriminate between inputs that are of interest and those that are not.

One detection system of this type is a neural network. In a neural network the set of known examples is used to train the network; and unknown objects are then processed by the neural network to determine if they are of interest or not. See, for example, D. A. Forsyth et al., *Computer Vision A Modern Approach*, ch. 22 (Prentice Hall, 2003) which is incorporated by reference herein.

Inevitably, these detection systems are involved in a tradeoff between sensitivity, or the fraction of true positives detected, and specificity or the fraction of false positives detected. This sensitivity/specificity tradeoff is often depicted in the detection system's receiver operating characteristic (ROC) curve such as that shown in FIG. 1. The ROC curve is a plot 100 of the fraction of true positives detected (TPF) as measured on the ordinate or y axis versus the fraction of false positives detected (FPF) as measured on the abscissa or x axis. As the fraction of true positives detected (or sensitivity) increases, so does the fraction of false positives detected, thereby decreasing the specificity. The determination of each fraction is discussed below.

In a relatively simple detection system, the detection process is binary. The data that is analyzed by the detection system can be classified in two groups: one group relates to a set of inputs that are being sought by the detection system and the other group relates to everything else, namely, a set of inputs that are not being sought by the detection system. In some cases, the detection system operates by generating a numerical score for each input and comparing that score with a threshold value developed from a set of training examples. Each input is assigned into one of the two groups depending on whether the input has a score above or below the threshold. For example, those inputs with scores above the threshold may then be the subject of further investigation while those below the threshold will be ignored.

Typically, the scores of the members of the two groups overlap so that some inputs that are being sought by the detection system have scores that are in the same range as the scores of inputs that are not being sought by the detection system. This situation is depicted in FIG. 2 which is a plot of numbers of inputs versus score for the inputs being sought and for the inputs not being sought. Envelope 210 depicts the distribution of the number of inputs being sought versus score and envelope 230 depicts the distribution of the number of inputs not being sought versus score.

If the threshold (TH) is set in the region where the scores of the two groups overlap, some inputs that are not being sought will be classified with those being sought. Such inputs are called false positives (FP) and are identified by region 240 in envelope 230 in FIG. 2. The remaining inputs in envelope 230 which are not being sought are referred to as true negatives (TN). Similarly, some inputs that are being sought will be classified with those not being sought. Such inputs are called false negatives (FN) and are identified by region 220 in envelope 210 in FIG. 2. The remaining inputs in envelope 210 which are being sought are called true positives (TP). The fraction of true positives detected that is measured on the y axis of FIG. 1 is the number of true positives detected divided by the total number of inputs under envelope 210 or #TP/(#TP+#FN). The fraction of false positives detected that is measured on the x-axis of FIG. 1 is the number of false positives detected divided by the total number of inputs under envelope 230 or #FP/(#FP+#TN). The fraction of true positives detected is also the probability of detecting a true positive and the fraction of false positives detected is also the probability of detecting a false positive.

As will be apparent, the location of the threshold has a substantial impact on the numbers of true positives, true negatives, false positives and false negatives. If the threshold is shifted so as to make more stringent the test for identification of an input being sought, both the number of true positives and the number of false positives identified will be reduced. As shown in FIG. 2, this is represented by a shift of the threshold to position A which reduces both the number of true positives and the number of false positives. Conversely, if the threshold is shifted so as to relax the test for identification of an input being sought, both the number of true positives identified and the number of false positives identified will be increased. This is represented in FIG. 2 by a shift of the threshold to position B which increases both the number of true positives and false positives. Reducing the numbers of true positives and false positives identified by making the identification test more stringent also reduces the fractions of true positives detected and false positives detected since the denominators of these fractions are unchanged and shifts the operating point of the detection system so that it is nearer the bottom left hand corner of the ROC curves of FIG. 1. Conversely, increasing the numbers of true positives and false positives by relaxing the identification test also increases the fractions of true positives detected and false positives detected and shifts the operating point of the detection system nearer the upper right hand corner of the ROC curve of FIG. 1.

In the medical arts, the trade-off between sensitivity and specificity that is represented by the ROC curve is always a concern. If the detection system is not sensitive enough, it may report too few true positives (i.e., more false negatives) which typically represent missed opportunities to detect some sort of problem that may well be life-threatening. On the other hand, if the detection system is not specific enough, it may report too many false positives which typically will result in the performance of additional medical procedures to establish the true nature of the false positive and, in many cases, considerable emotional stress on the part of the patient. Faced with this trade-off, the medical practitioner is usually forced to set the threshold of his/her detection system by trial-and-error at some value that assures the detection of significant numbers of true positives at the cost of some false positives.

SUMMARY OF THE PRESENT INVENTION

In the present invention, it has been found possible to avoid the processing of some false positives when certain conditions are met in the detection system. In one embodiment, the system uses two thresholds with the first threshold having a value greater than that of the second threshold. The second threshold is set at a value that assures detection of significant numbers of true positives and some false positives. The first threshold is set at a more stringent higher level, typically a score generated by a scoring algorithm for a known true positive input in a training set used to train the scoring algorithm. For example, the training set may consist of multiple inputs for each of a large group of patients known to be true positives and the threshold may be set at the lowest of the maximum score reported for each patient (i.e., minimum of maximum).

To classify an unknown set of inputs, the inputs are scored by the scoring algorithm and compared with the first threshold. If at least one score exceeds the first threshold, then all inputs having a score above the second threshold are classified as being of interest. If, however, no score exceeds the first threshold, then none of the inputs are classified as being of interest even though some of them may have scores above the second threshold. As a result, the medical practitioner is able to avoid the need to process any false positives that may be found above the second threshold in the case where there are no inputs with scores above the first threshold. Moreover, this may make it possible for the medical practitioner to lower the second threshold. Even though such lowering would increase the numbers of true positives and false positives that would be detected, the increase in false positives might be offset by the numbers of false positives that do not have to be processed when no input has a score above the first threshold.

In a specific application, the invention has been used in the detection of pulmonary embolisms using computer tomography.

In an alternative embodiment of the invention, a statistical approach is used instead of a pair of thresholds. In this method, a multiplicity of inputs are scored and the scored inputs are analyzed statistically to locate at least one input that has a score significantly greater than the scores of other inputs. For example, a search is made for inputs having scores that are two standard deviations in excess of the mean of all the inputs that are scored. If such an input is found, a numerical threshold used to classify the scored inputs is set so as to include a reasonable number of inputs in the class of interest and every input having a score in excess of that threshold is identified as belonging to that class. If no input is found that has a score significantly greater than the scores of the other inputs, then no inputs are identified as belonging to the class of interest.

In the foregoing embodiments of the invention, the scored inputs that are of interest are the high scoring inputs. Alternatively, the invention may also be practiced where the low scoring inputs are of interest. In one embodiment of such case, a search is made for an input having a score lower than a first threshold that is less than a second threshold. If such an input is found, all inputs having a score less than the second threshold are identified as belonging to the class of interest; and if no input is found with a score lower than the first threshold, no inputs are identified as belonging to the class of interest.

Preferably, the invention is implemented in a computer and in software running on the computer.

BRIEF DESCRIPTION OF THE DRAWINGS

These and other objects, features and advantages will be more readily apparent from the following Detailed Description in which.

DETAILED DESCRIPTION

Figure 1:
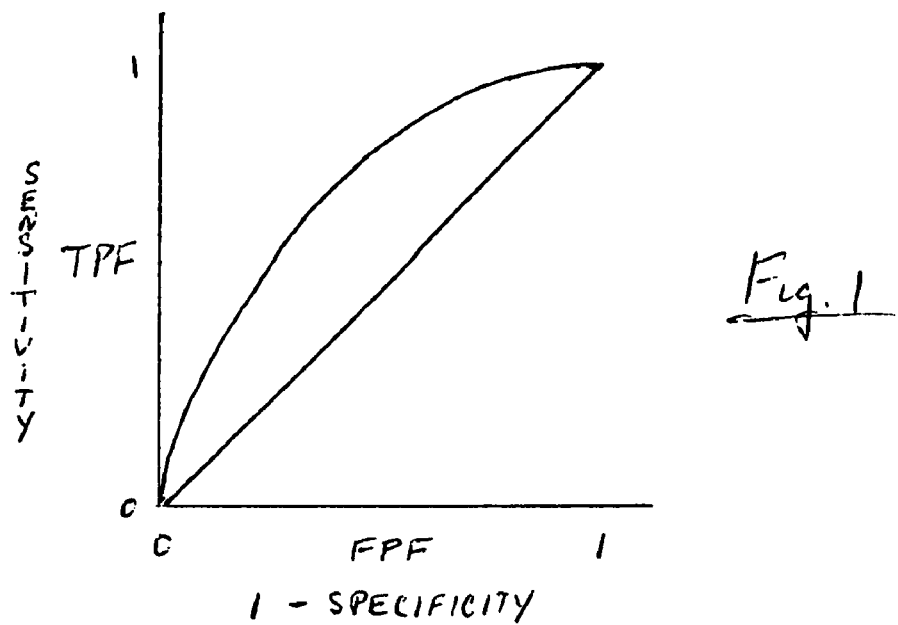
FIG. 1 is an illustrative plot of a receiver operating characteristic (ROC) curve.
Figure 2:
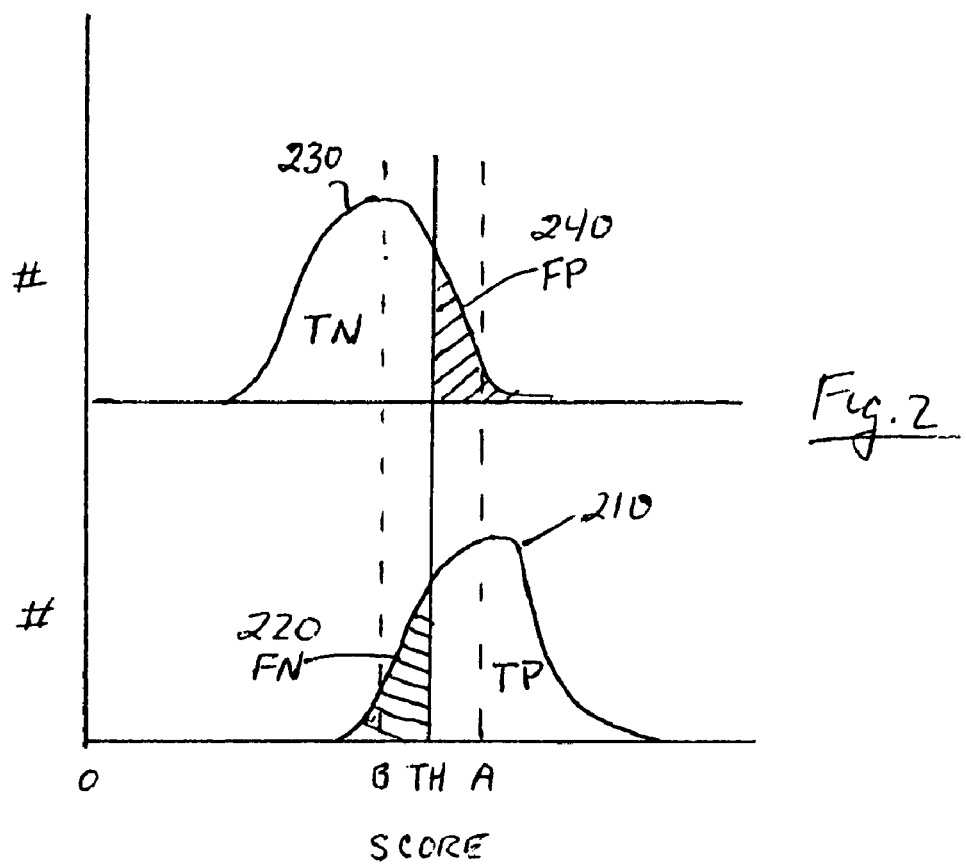
FIG. 2 is an illustrative plot of a typical data set used in generating a ROC curve.
Figure 3:
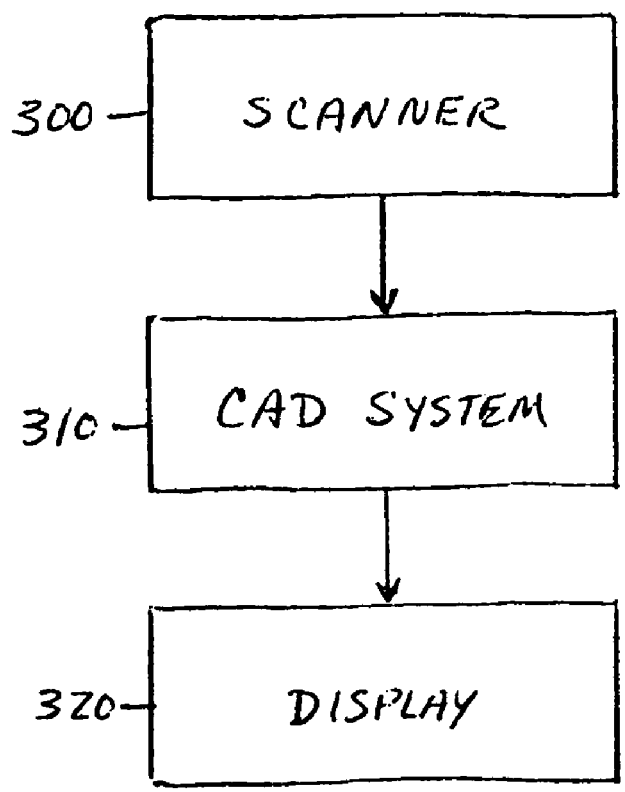
FIG. 3 is a block diagram of a system for practicing the invention.
Figure 4:
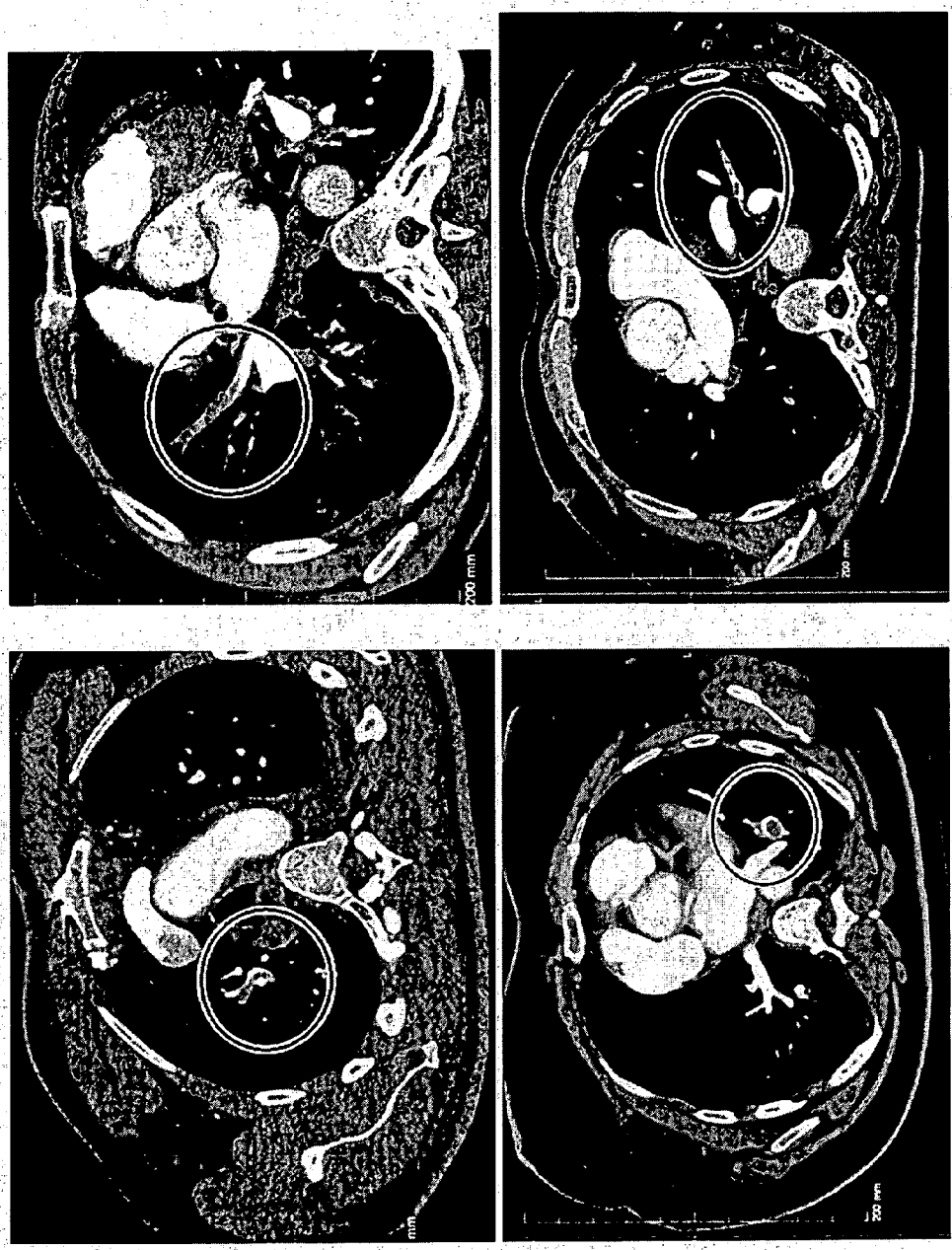
FIG. 4 depicts four CT images.

FIG. 3 is a block diagram of illustrative apparatus used in the practice of the invention. The apparatus comprises a multi-slice computer tomography (MSCT) scanner 300, a computer-aided-detection (CAD) system 310 and a display 320. MSCT scanners are commercially available and are sold by companies such as General Electric and Siemens. The detection system and display can be a personal computer or a work station operating under control of a suitable computer program. The scanners produce a series of digital images that are x-ray images of a series of slices through the patient's body. The digital images are then processed by the CAD system and displayed on display 320. Four such CT images are shown in FIG. 4. The circles indicate suspected pulmonary embolisms.

The processing that is performed includes the processing that creates a visual image from the x-ray data obtained by the scanner. Advantageously, the processing may also include processing that combines the two-dimensional image data on each slice to form a perspective view of a three-dimensional anatomical structure. In addition, the processing may also include analysis of the digital images to detect features that may be of interest to a medical practitioner, e.g., features indicative of cancer, blocked arteries and the like. One such prior art system is the assignee's ImageChecker® CT system. Certain details of this system are described in U.S. Pat. No. 6,925,200 which is incorporated herein by reference.

Figure 5:
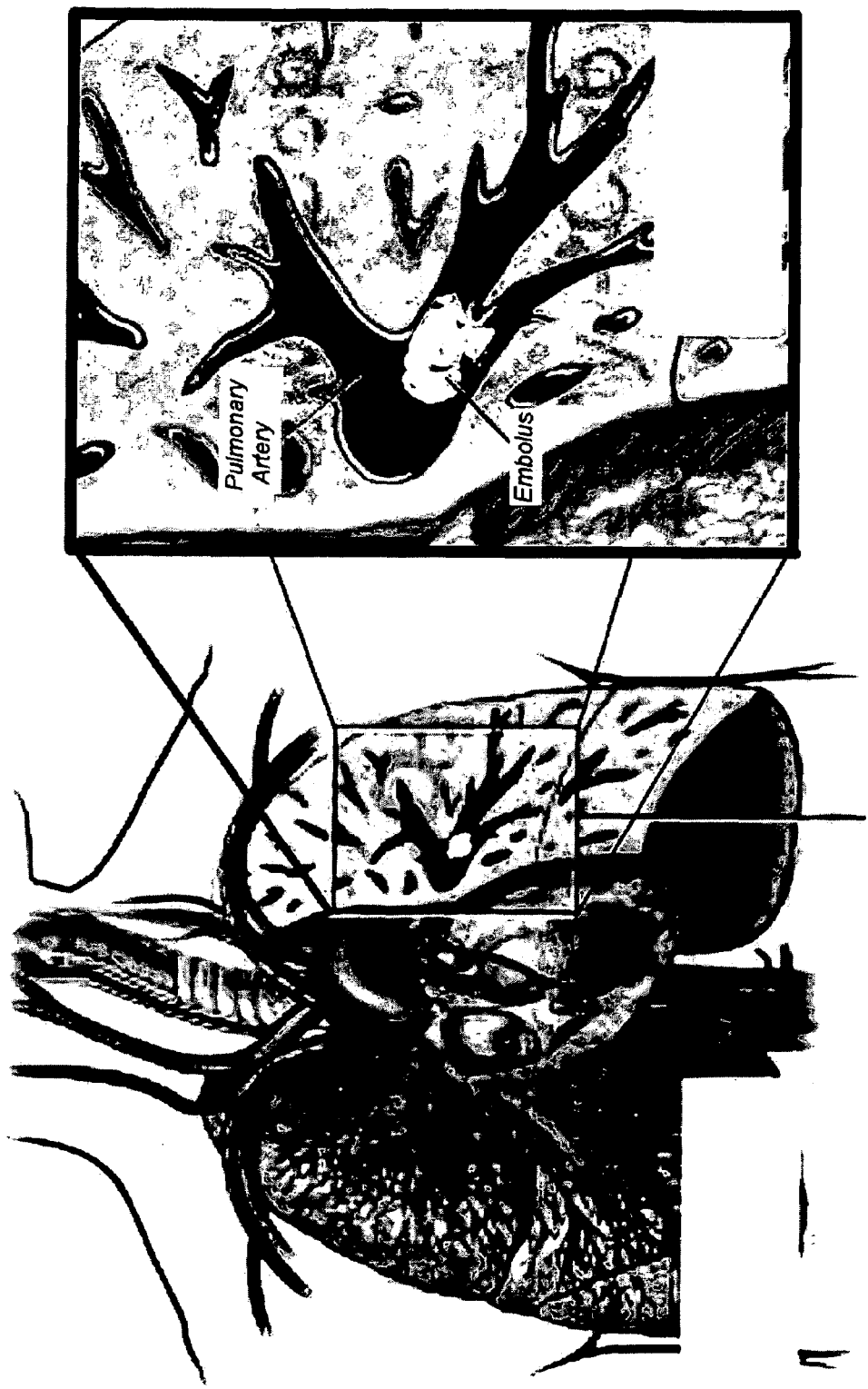
FIG. 5 is a schematic illustration of a pulmonary embolism.

In the present invention MSCT images have been processed by a processing system so as to increase the likelihood of detecting pulmonary embolisms. A pulmonary embolism is an embolus that gets lodged in one of the pulmonary arteries where it blocks blood flow and therefore oxygen exchange. Such blockage may impair heart function and in its more severe form cause circulatory collapse and death. FIG. 5 is an illustration of an embolus 500 blocking a pulmonary artery 510.

Algorithms are known for the processing of MSCT images of the lungs to detect pulmonary embolisms. Such algorithms detect pulmonary embolisms by segmenting regions of interest in the CT images, processing the regions of interest to develop a score for each region comparing the score with a threshold value. Typically, the higher the score, the more likely that the region of interest represents a pulmonary embolism; and accordingly all regions of interest having a score in excess of the threshold are reported as being pulmonary embolisms and those with scores less than the threshold are ignored.

As noted above, detection systems are usually operated so that some false positives are included among the detection events that are reported as pulmonary embolisms. Eliminating these false positives requires further medical procedures and, of course, is a source of concern to the patient.

Figure 6:
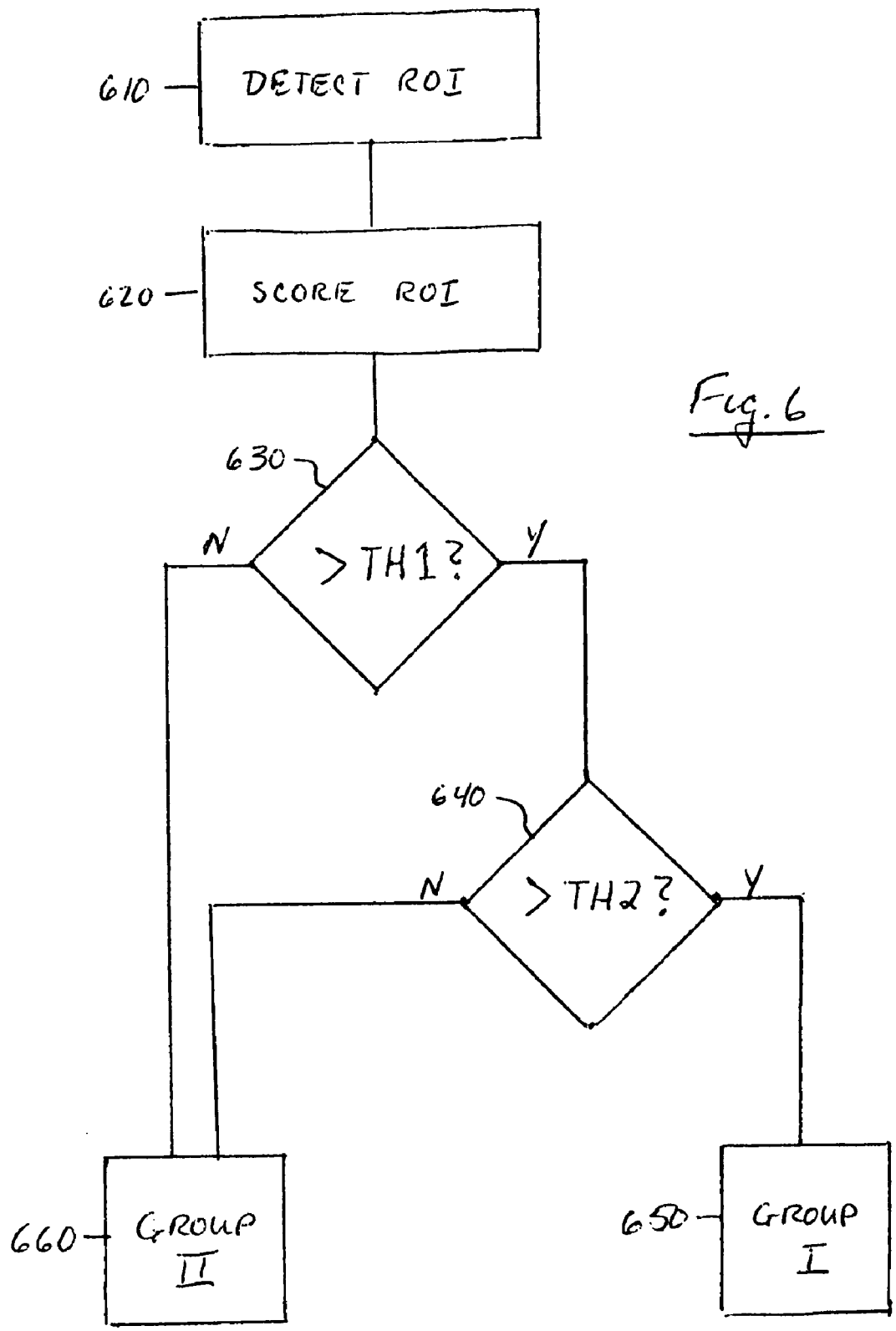
FIG. 6 is a flow chart of an illustrative embodiment of the invention.

FIG. 6 depicts a method for eliminating some of these false positives. Advantageously, this method is implemented by the CAD system 310 and software instructions for performing this method are stored in a suitable memory medium within the CAD system. A plurality of regions of interest (ROI) are first detected at step 610. The regions of interest are then scored at step 620. The scores are then compared at step 630 with a first threshold which is known to be fairly stringent. For example, the first threshold might have a value equal to that of one of the higher scores reported for a confirmed true positive in a training set that had been used to train the scoring algorithm. Specifically, the training set might consist of multiple inputs for each of a large group of patients known to be true positives and the score used to set the first threshold might be the minimum of the maximum score reported for each patient or the minimum of the five highest scores.

If any of the regions of interest have a score that exceeds the first threshold, then all the regions of interest are further examined at step 640 to determine if they exceed a second threshold that is less stringent than the first. All the regions of interest that exceed the second threshold are then classified in a first group 650 that requires further investigation and the regions of interest that do not exceed the second threshold are classified in a second group 660 that is ignored. However, if none of the regions of interest has a score that exceeds the first threshold, then all the regions of interest are classified in the second group 660 that is ignored.

As will be apparent to those skilled in the art, it is a matter of choice whether high scores or low scores are used to denote the inputs of interest. In the case where the scoring algorithm produces low scores that are of interest, the more stringent first threshold has a value less than that of the second threshold and the tests performed at steps 630 and 640 are whether the scores are less than the first and second thresholds, respectively.

The invention has been found to be especially useful in the detection of pulmonary embolisms in CT images. In the case of pulmonary embolisms, one prominent pulmonary embolism is usually accompanied by many smaller and less prominent pulmonary embolisms. As a result, in analyzing a CT scan of the lungs, a detection system can be expected to generate a high scoring input generated by the prominent pulmonary embolism and several lower scoring inputs generated by the other embolisms. Accordingly, when the invention is applied to the detection of pulmonary embolisms, the prominent pulmonary embolism generates a score that exceeds a first threshold set at the level of a score generated by the scoring algorithm for a known true positive input in the training set; and the other pulmonary embolisms generate lower scores. Some of these scores can be expected to be in the range between the first threshold and a second threshold set by the medical practitioner to determine which inputs he will accept for review. However, if no score exceeds the first threshold, then no pulmonary embolism is likely to be present and all the inputs can be ignored.

In an alternative embodiment, a multiplicity of inputs are scored and the inputs are analyzed statistically to locate at least one input that has a score significantly greater than the scores of the other inputs. For example, a search is made for inputs having scores that are more than two standard deviations in excess of the mean of all the inputs that are scored. If such input is found, a numerical threshold used to classify the scored inputs is set so as to include a reasonable number of inputs in the class of interest and every input having a score in excess of that threshold is identified as belonging to that class. If no input is found having a score that is more than two standard deviations in excess of the mean, no inputs are identified as belonging to the class of interest.

As will be apparent, the invention may be practiced in a variety of forms. For example, there may be considerable variation in the setting of the first and second thresholds. As indicated, for the embodiment of FIG. 6, the first threshold should be set at a value that corresponds to the value of a confirmed true positive in the training set used to train the scoring algorithm. It is likely that the true positives in the training set will have a substantial range of values between a lowest score and a highest score and it is expected that some improvements in performance of the invention in the sense of locating an optimum operating point on the ROC curve can be obtained by adjusting the first threshold within these limits. Likewise, the second threshold can be varied in an effort to find a score that admits no more than a tolerable number of false positives into the class of interest. If desired, adjustments of the second threshold can be made depending on whether any detection input is observed that exceeds the first threshold. In particular, if an input is observed that has a score that exceeds the first threshold, the second threshold can be made less stringent so as to admit more inputs into the class of interest; and if no input is observed that has a score that exceeds the first threshold, the second threshold can be made more stringent so as to reduce the number of inputs admitted into the class of interest.

What is claimed is:

1. A method of classifying detection inputs as belonging to a first class or a second class depending on a numerical score associated with each detection input, wherein the detection input comprises a digital image, comprising the steps of:
  segmenting each detection input into a multiplicity of regions of interest;
  scoring the multiplicity of regions of interest to produce a set of scores;
  determining a mean value of the set of scores of the multiplicity of regions;
  comparing each of the scores with a first threshold, the first threshold being two standard deviations exceeding the mean value of the set of scores of the multiplicity of regions,
  if at least one score exceeds the first threshold, classifying in the first class all regions of interest having a score that exceeds a second threshold, wherein the second threshold has a value lower than the first threshold, and
  if no score exceeds the first threshold, classifying each region of interest in the second class.

2. The method of claim 1 wherein each region of interest classified in the first class is indicative of pulmonary embolisms.

3. The method of claim 1 further comprising the step of training an algorithm for scoring the regions of interest using a training set comprising of at least one true positive region of interest.

4. A method of classifying detection inputs as belonging to a first class or a second class depending on a numerical score associated with each detection input, wherein the detection input comprises a digital image, comprising the steps of:
  segmenting each detection input into a multiplicity of regions of interest;
  scoring the multiplicity of regions of interest to produce a set of scores;
  setting a first threshold that is the score of a known true positive input in a training set used to train an algorithm for scoring the regions of interest;
  comparing each of the scores with the first threshold,
  if at least one score is less than the first threshold, classifying in the first class all regions of interest having a score that is less than a second threshold, wherein the second threshold has a value greater than the first threshold, and if no score is less than the first threshold, classifying each region of interest in the second class.

5. The method of claim 1 wherein each region of interest classified in the first class is indicative of pulmonary embolisms.

6. The method of claim 4 wherein the first threshold is set at the highest score of a group of lowest scores for known true positive inputs in a training set used to train an algorithm for scoring the regions of interest.

7. The method of claim 4 further comprising the step of training an algorithm for scoring the regions of interest using a training set comprising of at least one true positive region of interest.

8. A method of classifying detection inputs as belonging to a first class or a second class depending on a numerical score associated with each detection input, wherein the detection input comprises a digital image, comprising the steps of:
  segmenting each detection input into a multiplicity of regions of interest;
  scoring the multiplicity of regions of interest to produce a set of scores;
  comparing each of the scores with a first threshold,
  if at least one score exceeds the first threshold, lowering a second threshold that is lower than the first threshold, or if no score exceeds the first threshold, raising the second threshold, and
  classifying in the first class all regions of interest having a score that exceeds the second threshold.

9. The method of claim 8 wherein each region of interest classified in the first class is indicative of pulmonary embolisms.

10. The method of claim 8 further comprising the step of setting a first threshold that is the score of a known true positive input in a training set used to train an algorithm for scoring the regions of interest.

11. The method of claim 8 wherein the first threshold is set at the lowest score of a group of highest scores for known true positive inputs in a training set used to train an algorithm for scoring the regions of interest.

12. The method of claim 8 further comprising the step of training an algorithm for scoring the regions of interest using a training set comprising of at least one true positive region of interest.

13. A method of classifying detection inputs as belonging to a first class or a second class depending on a numerical score associated with each detection input, wherein the detection input comprises a digital image, comprising the steps of:
  segmenting each detection input into a multiplicity of regions of interest;
  scoring the multiplicity of regions of interest to produce a set of scores;
  comparing each of the scores with a first threshold,
  if at least one score is less than the first threshold, raising a second threshold that is greater than the first threshold, or if no score is less than the first threshold, lowering the second threshold, and
  classifying in the first class all regions of interest having a score that are less than a second threshold.

14. The method of claim 13 wherein each region of interest classified in the first class is indicative of pulmonary embolisms.

15. The method of claim 13 further comprising the step of setting a first threshold that is the score of a known true positive input in a training set used to train an algorithm for scoring the regions of interest.

16. The method of claim 13 wherein the first threshold is set at the highest score of a group of lowest scores for known true positive inputs in a training set used to train an algorithm for scoring the regions of interest.

17. The method of claim 13 further comprising the step of training an algorithm for scoring the regions of interest using a training set comprising of at least one true positive region of interest.

18. A method of identifying regions of interest in a medical image to detect a medical condition of a subject, the medical condition being characterized by prominent instances of the medical condition within the subject and minor instances of the medical condition within the subject, the method comprising:
  segmenting the medical image into a multiplicity of regions;
  scoring the multiplicity of regions to produce a set of scores for each region;
  defining a first threshold value indicating detection of a prominent instance of the medical condition;
  comparing each of the scores of the multiplicity of regions with the first threshold;
  if at least one score exceeds the first threshold value, classifying in a first class all regions of interest having a score that exceeds a second threshold value, wherein the second threshold value has a value lower than the first threshold value; and
  if no score exceeds the first threshold value, classifying each region of interest in a second class.

19. The method of claim 18 wherein the medical image is generated by a multi-slice computed tomography (MSCT) scanner.

20. The method of claim 18 wherein the medical condition is a blockage of a blood vessel.

21. The method of claim 18 wherein the medical condition is a pulmonary embolism.

22. A method of detecting embolisms in a subject by identifying regions of interest in a computed tomography image of the subject, the embolisms being characterized by prominent embolisms and minor embolisms, the method comprising:
  segmenting the computed tomography image into a multiplicity of regions;
  scoring the multiplicity of regions to produce a set of scores for each region;
  defining a first threshold value indicating detection of a prominent embolism;
  defining a second threshold value indicating detection of a minor embolism;
  comparing each of the scores of the multiplicity of regions with the first threshold;
  if at least one score exceeds the first threshold value, classifying in a first class all regions of interest having a score that exceeds the second threshold value, wherein the second threshold value has a value lower than the first threshold value, and
  if no score exceeds the first threshold value, classifying each region of interest in a second class.

* * * * *

UNITED STATES PATENT AND TRADEMARK OFFICE
CERTIFICATE OF CORRECTION

PATENT NO. : 7,623,694 B2
APPLICATION NO. : 11/344834
DATED : November 24, 2009
INVENTOR(S) : Philippe Raffy It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 565 days.

Signed and Sealed this

Twenty-sixth Day of October, 2010

David J. Kappos
*Director of the United States Patent and Trademark Office*